United States Patent [19]
Rozmus

[11] Patent Number: 5,295,645
[45] Date of Patent: Mar. 22, 1994

[54] AIRCRAFT VARIABLE GEOMETRY NOZZLE

[76] Inventor: Walter J. Rozmus, 6113 Zion Cir., Port Orange, Fla. 32019

[21] Appl. No.: 18,365

[22] Filed: Feb. 16, 1993

Related U.S. Application Data

[63] Continuation-in-part of Ser. No. 867,471, Apr. 13, 1992, Pat. No. 5,199,643.

[51] Int. Cl.⁵ .............................................. B64D 33/04
[52] U.S. Cl. .................. 244/53 R; 244/73 R; 239/546; 239/265.39
[58] Field of Search .................... 244/53 R, 73, 74; 239/265.39, 265.43, 265.17, 265.25, 265.33, 265.37, 546, 60; 446/56, 57; 60/235

[56] References Cited
U.S. PATENT DOCUMENTS

| | | | |
|---|---|---|---|
| 2,693,078 | 11/1954 | Laucher | 239/546 |
| 2,697,907 | 12/1954 | Gaubatz | 239/546 |
| 2,976,676 | 3/1961 | Kress | 239/265.39 |
| 3,460,763 | 8/1969 | Kopp | 239/265.43 |
| 3,767,120 | 10/1973 | Harmon | 239/265.39 |
| 4,850,535 | 7/1989 | Ivie | 239/265.39 |

Primary Examiner—Galen L. Barefoot
Attorney, Agent, or Firm—Ralph J. Skinkiss

[57] ABSTRACT

The present invention relates to a method and apparatus for providing an operable divergent/convergent variable geometry exhaust nozzle for jet propelled aircraft. A multiplicity of hinged, overlapping, nozzle blades circumferentially surround the exhaust nozzle thereby providing a divergent cylindrical exhaust nozzle that may be convergingly reduced to a conical configuration by action of a remotely controlled solenoid.

20 Claims, 5 Drawing Sheets

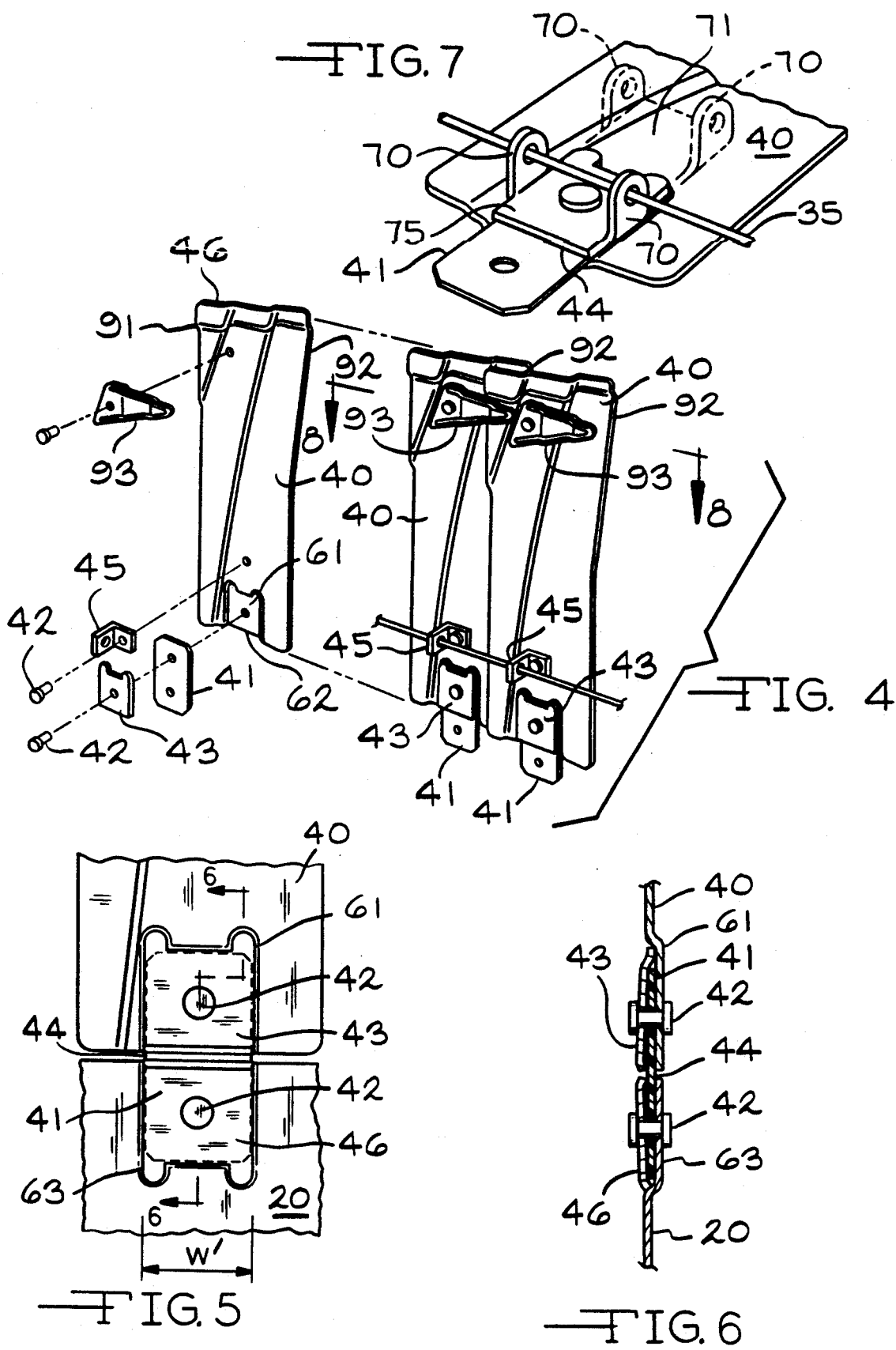

AIRCRAFT VARIABLE GEOMETRY NOZZLE

RELATED APPLICATIONS

This application is a continuation in part of my application Ser. No. 07/867,471 filed on Apr. 13, 1992, now U.S. Pat. No. 5,199,643.

BACKGROUND OF THE INVENTION

1. Field of the Invention

The present invention relates to jet propelled aircraft. Although the disclosure herein specifically relates to remotely controlled, flying scale model aircraft, the invention as disclosed and claimed herein may also be used on full size aircraft and for other related uses. In the scale model aircraft industry great efforts are taken to accurately reproduce the particular full size operational aircraft being modeled, both in appearance and operational characteristics. Although great strides have been achieved in the industry, one area affecting both appearance and scale model performance has been neglected; that being the jet exhaust nozzle. Operational full size jet aircraft of the present day are commonly equipped with exhaust nozzles having controllable variable area geometry; that is to say that the exit diameter of the jet nozzle may be varied depending upon the particular flight regime within which the aircraft is being operated. Two particular flight regimes that require different exhaust nozzle configurations, for both full size and scale model aircraft, are take-off and in flight cruse. Full size operational aircraft employ maximum exhaust nozzle diameters for take-off and decrease or restrict the exhaust nozzle diameter during in flight cruse. It is an established fact that jet propelled aircraft, full size or scale model aircraft, cannot have a cruising velocity, or air speed, greater than the exit velocity of the jet engine exhaust at the tail pipe exhaust nozzle. It is also established that the optimum exhaust nozzle configuration to produce maximum thrust at take-off (requiring a large diameter nozzle opening) is not optimum at cruse where less than take-off thrust is required to propel the aircraft at a constant velocity or air speed. Therefore, full size operational aircraft are equipped with variable area geometry exhaust nozzle whereby the diameter of the nozzle may be decreased or restricted to a smaller, more optimum, diameter for in flight cruse (thereby providing increased exhaust gas velocities permitting increased flight velocities) and open to full diameter or take-off and landing.

Scale model jet aircraft using ducted fan technology to obtain a propelling thrust from the exhaust nozzle, experience similar nozzle configuration problems as their full counterparts; that being that a large diameter exhaust nozzle configuration is desired for take-off however, a smaller or reduced diameter nozzle diameter is desired for in flight cruse.

2. Description of the Prior Art

U.S. Pat. No. 2,634,578 issued to G. W. Kallal on Apr. 14, 1953 for a "Device For Varying The Effective Area Of Discharge Orifices Of Jet Engines Or Afterburners Therefor" teaches a variable area jet exhaust nozzle which relies upon the high pressure gases within and exiting the nozzle to force the nozzle to its full open position. The nozzle exit diameter may be decreased by winding, upon a motor driven drum, a cable which is threaded through a series of guides circumferentially spaced about the external rearward periphery of the nozzle. Thus to convergingly reduce the nozzle exit diameter, the drum is rotated so as to wind in the control cable thereby reducing the nozzle exit diameter. To expand the nozzle exit diameter, a brake or other type of locking mechanism upon the drum is released thereby permitting the cable to unwind from the drum permitting the nozzle exit diameter to increase by action of the high pressure exhaust gases acting upon the inside surface of the nozzle. It is therefore apparent that the variable area nozzle as taught in the U.S. Pat. No. 2,634,578 can only be operated when the engine is operating and high pressures gases are flowing therethrough.

U.S. Pat. No. 4,850,535 issued to P. B. Ivie, on Jul. 25, 1989 for a "Variably Convergent Exhaust Nozzle For A Model Ducted Fan Unit" teaches a variable area exhaust nozzle for use on a scale model jet propelled aircraft wherein the nozzle comprises a multiplicity of circumferentially spaced apart, axially extending, inner leaves circumscribed by a multiplicity of, axially extending, overlapping spaced apart outer leaves. The outer leaves are affixed to hinges having hinge arms extending the full axial length of each leaf thereby providing structural rigidity to each outer leaf. Threaded through guides at the rearward end of each hinge arm is one of two control cables; each cable controlling half of the hinge arms or 180 degrees of the nozzle. The control cables are attached to a servo motor that, when the control cables are pulled taught, the diameter of the nozzle exit end is caused to constrict or decrease.

Similar to the nozzle taught in U.S. Pat. No. 2,634,578, discussed hereinabove, the nozzle of U.S. Pat. No. 4,850,535 has no positive mechanical means for opening the nozzle to its full divergent configuration. Both nozzles must rely upon gas pressure, within the nozzle, to return the nozzle to its full open position.

SUMMARY OF THE PRESENT INVENTION

The present invention provides method and apparatus for varying the exhaust nozzle configuration of jet propelled aircraft, to provide the jet thrust and velocity desired for the flight regime within which the aircraft is operating. A plurality of overlapping exhaust nozzle blades are circumferentially and hingedly attached to the exit opening of the tail pipe such that the exit diameter of the nozzle may be full open for the take-off regime and convergingly restricted in flight to a smaller diameter thereby producing an increase in exhaust gas velocity resulting in an increase in cruse air speed.

A single flexible push-pull nozzle actuation rod is threaded through eyelets affixed to the inside surface of the nozzle blades; the rod end being affixed to an appropriate blade after circumscribing a at least a full 360 degrees. The opposite end of the push-pull rod is suitably attached to controlled motive apparatus such as a radio actuated solenoid in the case of a scale model aircraft. By pushing or pulling of the nozzle actuation rod the diameter of the rod loop passing through the circumscribing eyelets is caused to increase or decrease, thus the nozzle crossectional exit area of the nozzle is respectively increased or decreased. Therefore, by the present invention, means is provided to fully open and/or close the nozzle without relying upon the action of internal gas pressure. Thus the nozzle operation may be fully tested and/or operated prior to engine start-up.

BRIEF DESCRIPTION OF THE DRAWINGS

FIG. 4 shows a fragmentary exploded pictorial view of a first structural embodiment of my variable geometry nozzle.

FIG. 5 is a fragmentary elevational view of the preferred hinge employed to fasten the variable position blades to a nozzle ring.

FIG. 6 is a sectional view taken along line 6—6 of FIG. 5.

FIG. 7 is a partial pictorial view of a second embodiment showing the blade activation wire eyelets incorporated into the blade hinge plate.

DETAILED DESCRIPTION OF THE INVENTION

Since the description hereinafter will specifically refer and/or otherwise described my invention as applied to a scale model aircraft powered by an internal ducted fan power plant, the term "wire" will be used in place of the term "actuation rod." The scale of the actual reduction to practice as described hereinafter, in fact, employed a 0.025 inch stainless steel wire applied to a one fifth scale model of an F-16 aircraft. It is to be understood that as the scale of the applicable aircraft is increased up to and including the full scale operational aircraft, the actuation wire/rod will assume material and configuration changes appropriate for the given application.

Figure 1:
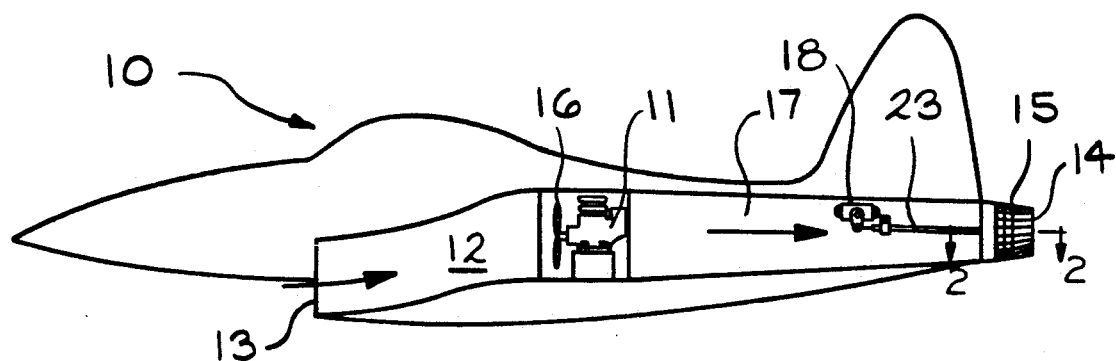
FIG. 1 presents a sectional view of a typical jet propelled scale model aircraft embodying my variable geometry thrust nozzle.

FIG. 1 shows a typical ducted fan propulsion system as commonly used in a scale model jet aircraft 10 to provide the required operational thrust. Typically a gasoline engine 11 is positioned within duct 12 having an inlet 13, a tail pipe 17 and an exhaust exit 14. The engine 11 typically drives a multi-blade propeller 16, or other type of fan assembly, which generally draws mass air flow into the inlet 13, at a pressure lower than atmospheric, past the propeller 16 and over engine 11, thereby providing combustion and cooling air for the engine. Energy is imparted to the air mass by propeller 16 and is thus accelerated, at a pressure higher than atmospheric, through tail pipe 17 and toward the exhaust exit 14 exiting therefrom as thrust which propels the aircraft forward.

Figure 2A:
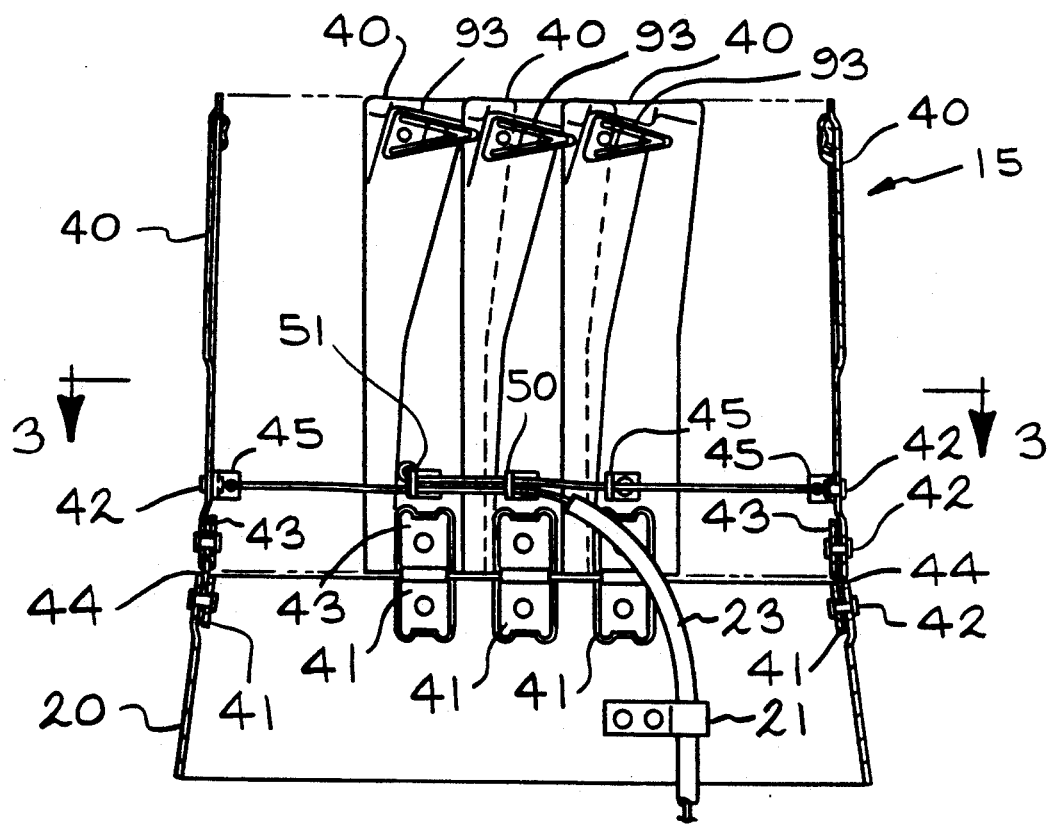
FIG. 2A presents a sectional view of my variable geometry thrust nozzle as taken along line 2—2 of FIG. 1 showing the nozzle in the full open cylindrical configuration.
Figure 2B:
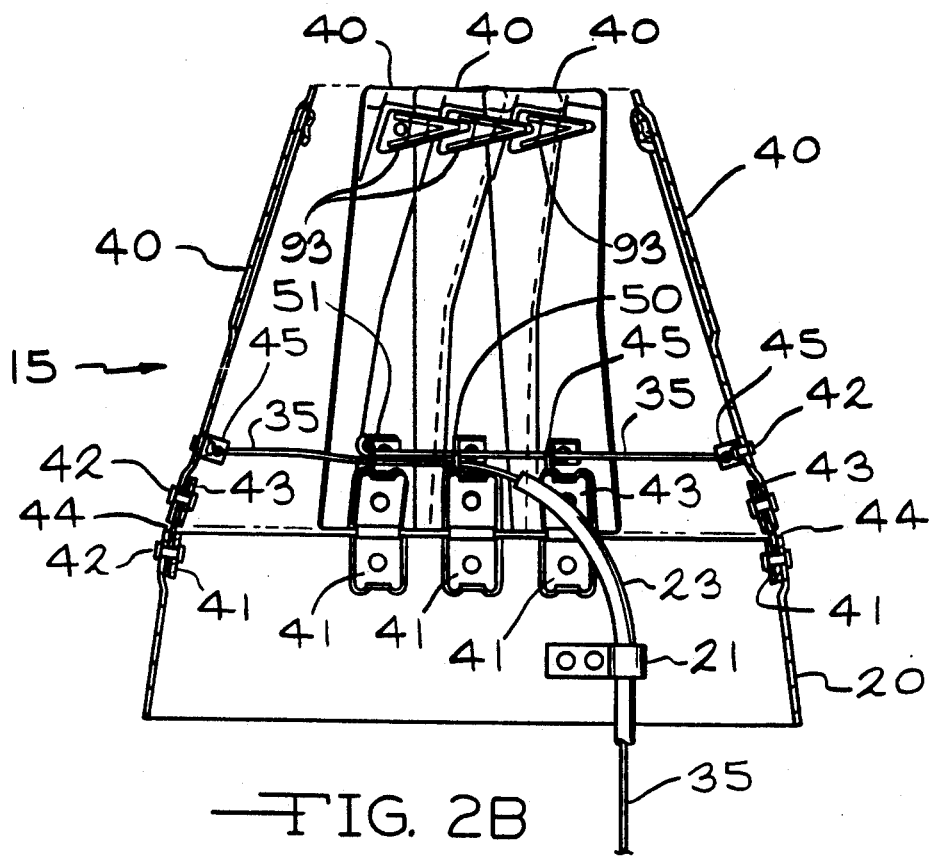
FIG. 2B presents a sectional view of my variable geometry thrust nozzle as taken along line 2—2 of FIG. 1 showing the nozzle in the restricted or converged conical geometry.

A variable geometry exhaust nozzle 15 is provided at exit 14 of tail pipe 17. Nozzle 15 may be selectively positioned in the full divergent open position as shown in FIG. 2A, or in a convergent restricted mode, as shown in FIG. 2B, thereby reducing the diameter of the exit nozzle and increasing the exit velocity of the accelerated air mass as it exits the aircraft 10.

Figure 3:
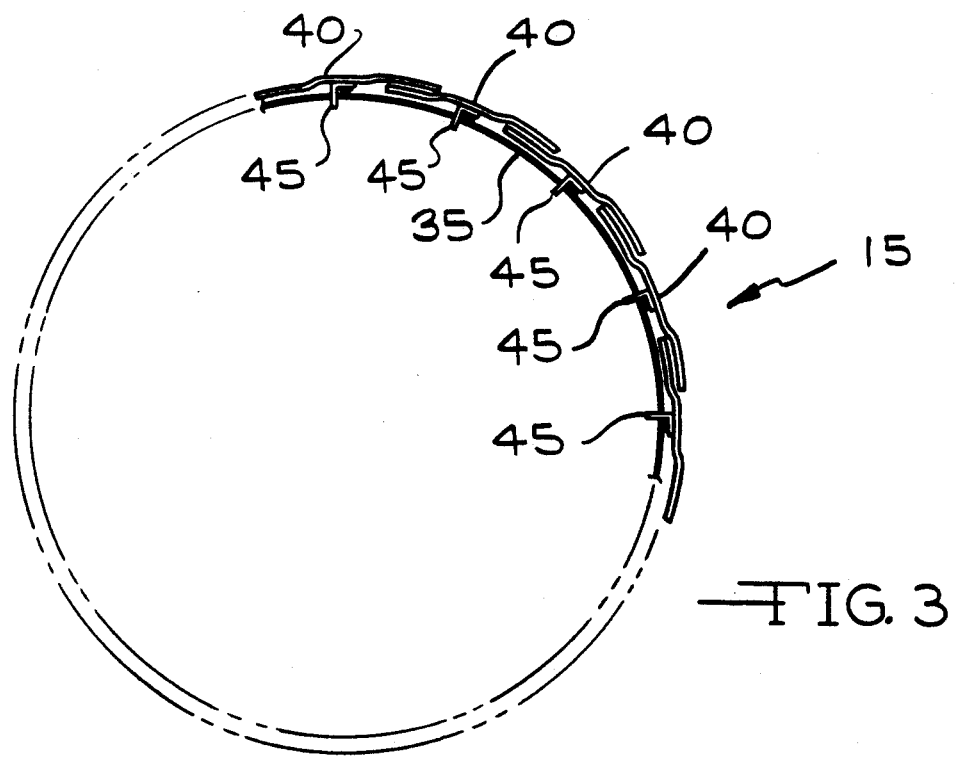
FIG. 3 is a sectional view taken along line 3—3 of FIG. 2A.

Referring to FIGS. 1 through 6, nozzle 15 comprises a plurality of blades 40 slidingly and overlappingly interconnected with one another as shown in FIGS. 3 and 4. Each blade 40 is hingedly connected to a nozzle attachment ring 20 by a flexible hinge strap 41 rigidly affixed to blade 40 and the nozzle attachment ring 20 by any suitable means such as rivets 42. Embossed within each blade is a hinge receiving recess 61 receiving therein hinge 41. Width W of hinge recess 61 is such that hinge 41 tightly fits therein, thereby preventing rotational movement of hinge 41 about rivet 42. Similar hinge receiving recesses 63 are also provided on attachment ring 20. As best shown in FIGS. 5 and 6. It is preferred to interpose hinge straps 41 between the hinge recesses 61 and/or 63 and rivet plates 43 and 46 respectively, thereby assuring that the hinge line 44 remains a straight line paralleling the free edge 62 of the hinge recess 61. Typically suitable hinge material is that which is commonly used in the model aircraft industry for hingedly connecting flight control surfaces such as elevators and/or rudders to the horizontal and vertical stabilizer respectively.

Figure 8A:
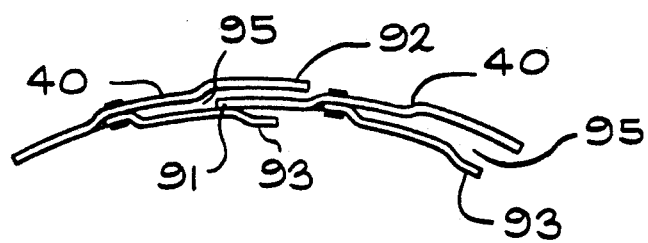
FIG. 8A is a sectional view taken along line 8—8 of FIG. 4 showing the nozzle in the full open configuration.
Figure 8B:
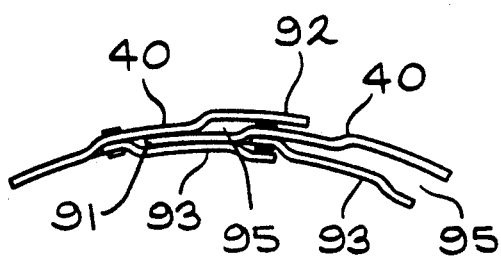
FIG. 8B is a sectional view taken along line 8—8 of FIG. 4 showing the nozzle in the restricted configuration.

As seen in FIGS. 3, 4, 8A and 8B, the blades 40 overlappingly interconnect with one another to form the variable area geometry nozzle 15. FIG. 8A shows the overlapping of blades 40 when nozzle 15 is in the full open or cylindrical configuration and FIG. 8B shows the overlapping configuration of adjacent blades 40 when nozzle 15 is in the restricted or conical configuration.

Figure 10:
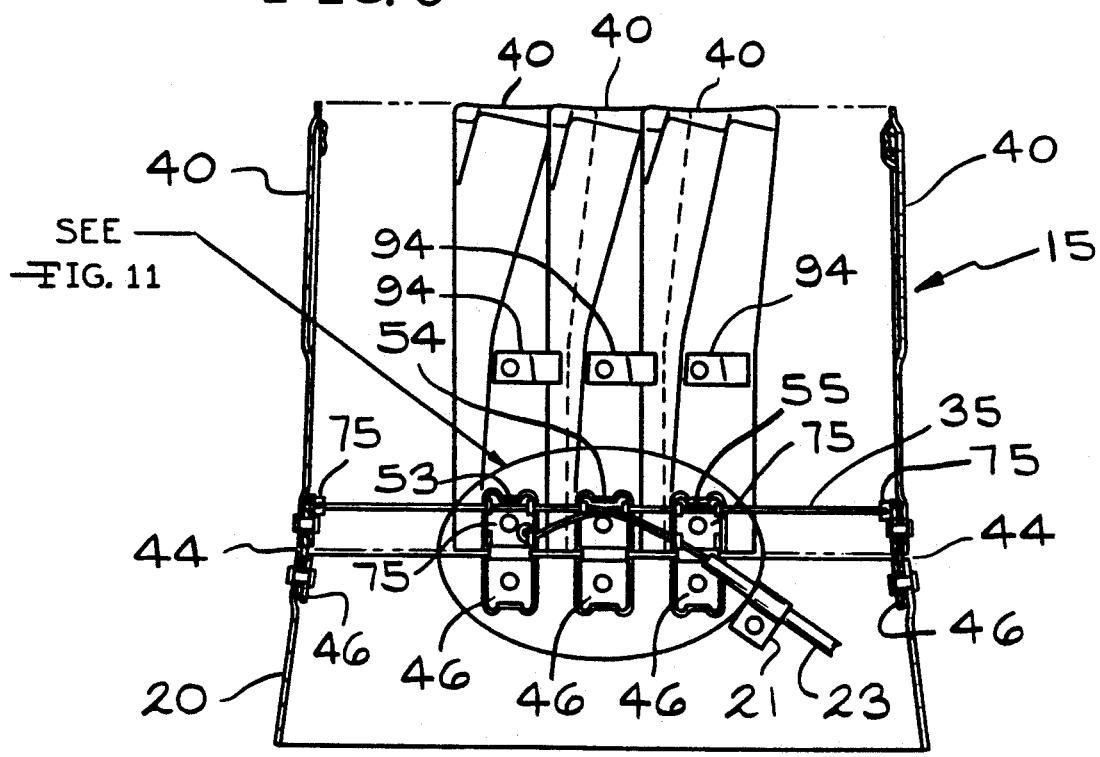
FIG. 10 is a crossectional view similar to that of FIG. 2A showing the second embodiment wherein the blade activation rod is incorporated into a blade hinge plate as illustrated in FIG. 7.

When in the full open divergent configuration, as shown in FIG. 8A and FIG. 4, the leading edge 91 of blade 40 overlaps the trailing edge 92 of the adjacent blade 40, as shown, and is slidingly retained between the adjacent blade 40 and its associated clip 93. As nozzle 15 is convergingly closed or restricted by action of push-pull wire 35, as described below, each blade 40 is caused to further overlap the adjacent blade 40, as shown in FIG. 8B, by the leading edge 91 circumferentially advancing further into the gap 95 between the adjacent blade 40 and its associated clip 93, as shown in FIG. 8B, thereby convergingly reducing the nozzles exit diameter. Although the clips 93 are shown positioned near the exit opening of the nozzle, clips 93 may be moved axially forward if desired as shown in FIG. 10.

Referring now to FIGS. 2A, 2B, 3, and 4 the nozzle actuation system will be further described. Each nozzle blade 40 includes an eyelet 45, suitably attached thereto as by rivet 42. Although it is preferred to have an eyelet 45 attached to each blade 40 it may be acceptable to attach eyelets 45 to alternating blades, or in some other suitable pattern depending upon the particular application. Push-pull wire 35, is threaded through each eyelet 45 thereby forming a 360 degree loop circumscribing the inside periphery of nozzle 15 as illustrated in FIGS. 2A, 2B, and 3. As best seen in FIGS. 2A and 2B, push-pull wire 35 first enters entry eyelets 50 and 51, and is then threaded through the remaining eyelets 45, completely circumscribing the inside periphery of nozzle 15, re-entering the first entry eyelet 50 passing therethrough to the second entry eyelet 51 and suitably affixed thereto.

Referring to FIG. 2A, it will be appreciated that as push-pull wire 35 is withdrawn from eyelet 50 and because activation wire 35 is anchored to eyelet 51, the circumscribed diameter of the wire loop within eyelets 45 will necessarily decrease, as shown in FIG. 2B, thereby convergingly closing the nozzle exit opening to the conical configuration. Similarly, it will be appreciated, referring to FIG. 2B, that as push-pull wire 35 is advanced into entry eyelet 50, the circumscribed diameter of the wire loop within eyelets 45 will necessarily increase thereby returning nozzle 15 to its full open divergent configuration as shown in FIG. 2A or any desired configuration therebetween.

It is preferred that the portion of sheath 23 extending from anchoring bracket 21, on attachment ring 20, extend to within close proximity of entry eyelet 50 to substantially restrict wire 35 to a desired fixed curvature between bracket 21 and eyelet 50, thereby preventing wire 35 from bowing outward or otherwise deforming when wire 35 is under the compressive loads applied during opening of nozzle 15 to its full open configuration.

FIGS. 7 and 10 show a second embodiment of my invention wherein eyelets 70 are incorporated into hinge plate 75. Although the moment arm of eyelets 70, from hinge line 44, has been substantially reduced, it has been found that sufficient torque about hinge line 44 can nevertheless be produced to adequately operate the nozzle. However, as is illustrated in FIG. 7, hinge plate 75 may be provided with an extended arm 71 to increase the moment arm of eyelets 70 from the hinge line 44 thereby providing an increase in the applicable torque delivered to the associated blades.

Figure 11:
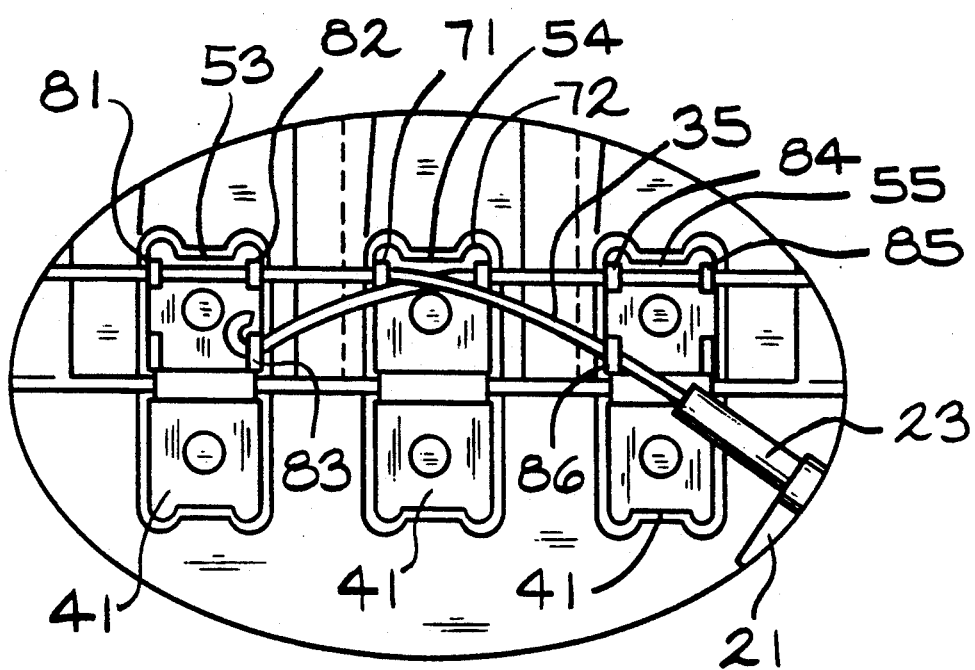
FIG. 11 is an enlarged view of the actuation rod entry eyelets as indicated in FIG. 10.

FIG. 11 is an enlarged view of the entry eyelet hinge plates 53, 54, and 55 as indicated in FIG. 10. As observed, in FIG. 11, hinge plates 53 and 55 are each provided with at least three eyelets, 81, 82, 83, 84, 85, and 86. Actuation wire 35 first enters eyelet 86 proceeding therefrom to eyelet 71 of plate 54 and therefrom extending circumferentially through eyelets 82 and 83 of plate 53 and thereafter around the inside periphery of nozzle 15 through eyelets 45. Upon circumscribing the nozzle, actuation wire 35 enters eyelets 85, 84 and 72 of plates 55 and 54 respectively. After passing through eyelet 72 of plate 54, wire 35 crosses under (or over if desired) the lead-in portion of wire 35 and is rigidly affixed to anchor eyelet 83.

It has been observed that, because of the constant frictional ware experienced by the entry eyelets of both embodiments, that it is preferable to manufacture the entry eyelets and/or entry eyelet plates from a ware resistant material such as brass or other suitable material. It has also to be noticed, as shown in FIG. 10, that the clips 93 of FIG. 4 have been removed and newly configured clips 94 have been provided at approximately the mid point of nozzle 15.

Although it is desired to place actuation wire 35 and eyelets 45 inside nozzle 15 for appearance sake; actuation wire 35 and eyelets 45 may just as well be placed on the outside of nozzle 15.

It is presently common to replace the traditional metal bowden cable, comprising a wire passing through a flexible metal sheath, with a flexible plastic bowden cable generally comprising a hollow plastic sheath having therein a tubular, coaxial, plastic, push-pull rod. This type of push-pull rod has proven to be a more desirable type of push-pull control for use in scale model aircraft. However, the inner tubular, plastic push-pull rod is not a suitable replacement for the actuation wire 35 of the above described nozzle actuation mechanism. Therefore it is necessary, when using such a tubular plastic push-pull control means, to provide an adequate conversion or transition piece from the plastic push-pull rod to the metal actuation wire 35.

Figure 9:
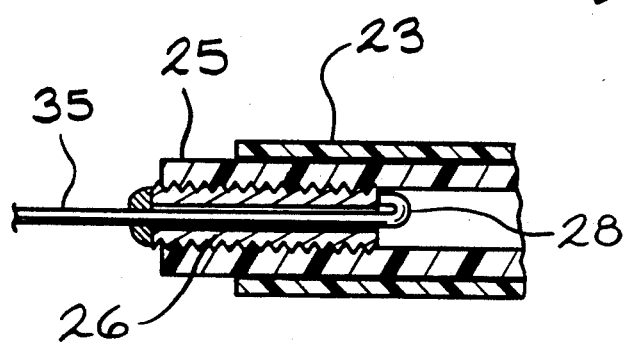
FIG. 9 is a crossectional view showing the preferred method of joining the nozzle activation rod to a typical plastic push-pull tube.

FIG. 9 presents a crossectional view of a preferred method for connecting a typical plastic push-pull control rod to a 0.025 inch stainless steel actuation wire 35 as used in my actual reduction to practice. A threaded stud 26 having an axial bore extending centrally therethrough is placed upon wire 35 as shown in FIG. 9. The end 28 of wire 35 is turned back upon itself, as shown, thereby preventing stud 26 from sliding off wire 35. The end 28 of wire 35 might also have a globule of solder, or other suitable material, placed thereon to retain stud 26. At the axially opposite end (the forward end) of stud 26 another globule of solder is placed upon wire 35 thereby confining stud 26 therebetween. Stud 26 is then threaded into the inside diameter of push-pull rod 25 which slidingly passes through sheath 23. Thus as push-pull rod 25 is axially moved fore and aft within sheath 23, by action of solenoid 18, actuation wire 35 likewise axially translates thereby opening and/or closing nozzle 15. Since threaded stud 26 is only axially confined upon actuation wire 35 by said globules, stud 26 is free to rotate about wire 35; thus no torsional forces are imparted to wire 35 by movement of push-pull rod 25 within sheath 23. However if desired threaded stud 26 may be rigidly affixed to wire 35.

Although the invention has been described in detail with reference to the illustrated preferred embodiments, variations and modifications exist within the scope and spirit of the invention as described and defined in the following claims.

I claim:

1. In a jet propelled aircraft receiving its forward propelling thrust from the exit of high velocity gases from a rearwardly directed tail pipe, said tail pipe including a variable area exhaust nozzle affixed to the exit end thereof, said nozzle having a multiplicity of axially extending overlapping blades circumferentially spaced about the exit end of said tail pipe, each of said blades hingedly connected to said tail pipe, the improvement comprising:

a. eyelet means attached to the inside surface of selected nozzle blades,
   b. actuation rod means circumscribing the inside periphery of said nozzle blades and passing through said eyelets;
   c. means for securing one end of said actuation rod means with the oppose free end thereof connected to motive means for applying a push or pull force to said actuation rod means whereby the diameter of said circumscribing actuation rod passing through said eyelets is caused to increase or decrease thereby causing said nozzle blades to rotate inwardly towards the nozzle centerline or outwardly from said nozzle center line thereby increasing or decreasing the exit end of said tail pipe accordingly.

2. The improvement as claimed in claim 1 wherein the secured end of said actuation rod is affixed to one of said blades.

3. The improvement as claimed in claim 1 wherein said motive means may be selectively activated by remotely controlled means.

4. The improvement as claimed in claim 2 wherein said remotely controlled means comprises a radio controlled solenoid.

5. The improvement as claimed in claim 1 wherein:
   a. said blades are hingedly affixed to a nozzle attachment ring, said attachment ring affixed to and circumscribing said tailpipe opening,
   b. said attachment ring having a multiplicity of first recessed areas at least one recessed area for each of said blades,
   c. each of said blades having corresponding second recessed areas,
   d. a flexible hinge positioned within each of said first recessed areas and extending longitudinally into each of said recessed areas,
   e. first and second place means positioned atop said hinge and over said first and second recessed areas respectively thereby restraining said hinge between said plate means and said recessed area,
   f. fastener means extending through each of said plate means, said hinge and the associated recessed area thereby affixing each of said hinges to said ring and an associated blade forming a hinge line generally paralleling the periphery of said ring whereby said blades may convergingly rotate inward toward the tailpipe center line and divergingly rotate outward from said centerline,
   g. said second plate means having said eyelet means attached thereto and axially displaced rearward from said hinge line.

6. The improvement as claimed in claim 5 wherein said hinge comprises a hinge strap.

7. The improvement as claimed in claim 1 wherein said free end of said activation rod is fist attached to a tubular plastic push-pull rod, said tubular push-pull rod slidably extending through an outer tubular sheath, wherein said opposite end of said push-pull rod is attached to said motive means, and said opposite ends of said outer tubular sheath is affixed to the frame of said aircraft.

8. The improvement as claimed in claim 7 wherein said actuation rod is attached to said tubular push-pull rod by swiveling transition means whereby said actuation rod and said tubular push-pull rod are fee to rotate relative to each other.

9. The improvement as claimed in claim 8 wherein said swiveling transition means comprises a stud having an axial bore extending the length thereof, said actuation rod free end extending axially through said bore, said rod having first restraining means at the end thereof whereby said stud is confined upon said rod, second restraining means upon said rod at the opposite end of said stud whereby said stud is restrained from axial movement upon said rod, said stud secured to the inside surface of said tubular push-pull rod.

10. The improvement as claimed in claim 9 wherein said stud includes external threads which are threadingly received inside said tubular push-pull rod.

11. The improvement as claimed in claim 9 wherein said first restraining means comprises a 180 degree bend at the terminating end of said actuation rod.

12. The improvement as claimed in claim 9 wherein said first and second restraining means comprises a globule of solidified metal.

13. The improvement as claimed in claim 11 wherein said second restraining means comprises a globule of solidified metal.

14. In a jet propelled aircraft receiving its forward propelling thrust from the exit of high velocity gases from a rearwardly directed tail pipe, said tail pipe including a variable area exhaust nozzle affixed to the exit end thereof, said nozzle having a multiplicity of axially extending overlapping blades circumferentially spaced about the exit end of said tail pipe, each of said blades hingedly connected to said tail pipe, the improvement comprising:
   a. eyelet means attached to selected nozzle blades,
   b. a unitary, pliable actuation rod circumscribing the periphery of said nozzle blades and passing through said eyelets,
   c. means for securing one end of said actuation rod with the opposite free end thereof connected to motive means for applying a push or pull force to said actuation rod whereby the diameter of said circumscribing actuation rod is caused to increase or decrease thereby causing said nozzle blades to rotate inwardly towards the nozzle centerline or outwardly from said nozzle center line thereby increasing or decreasing the exit end of said tail pipe accordingly.

15. The improvement as claimed in claim 14 wherein said eyelets are attached to the inside surface of said blades.

16. The improvement as claimed in claim 14 wherein the secured end of said actuation rod is fixedly attached to one of said blades.

17. The improvement as claimed in claim 14 wherein said motive means may be selectively activated by remotely controlled means.

18. The improvement as claimed in claim 17 wherein said remotely controlled means comprises a radio controlled solenoid.

19. The improvement as claimed in claim 14 wherein:
   a. said blades are hingedly affixed to a nozzle attachment ring, said attachment ring affixed to and circumscribing said tailpipe opening,
   b. said attachment ring having a multiplicity of first recessed areas at least one recessed area for each of said blades,
   c. each of said blades having corresponding second recessed areas,
   d. a flexible hinge positioned within each of said first recessed areas and extending longitudinally into each of said second recessed areas,
   e. first and second plate means positioned atop said hinge and over said first and second recessed areas respectively thereby restraining said hinge between said plate means and said recessed area,
   f. fastener means extending through each of said plate means, said hinge and the associated recessed area thereby affixing each of said hinges to said ring and an associated blade forming a hinge line generally paralleling the periphery of said ring whereby said blades may convergingly rotate inward toward the tailpipe center line and divergingly rotate outward from said centerline,
   g. said second plate means having said eyelet means attached thereto and axially displaced rearward from said hinge line.

20. The improvement as claimed in claim 18 wherein said hinge comprises a hinge strap.

* * * * *